Feb. 28, 1933.  E. P. HAMMOND  1,899,270
STEERING GEAR
Filed Sept. 8, 1931
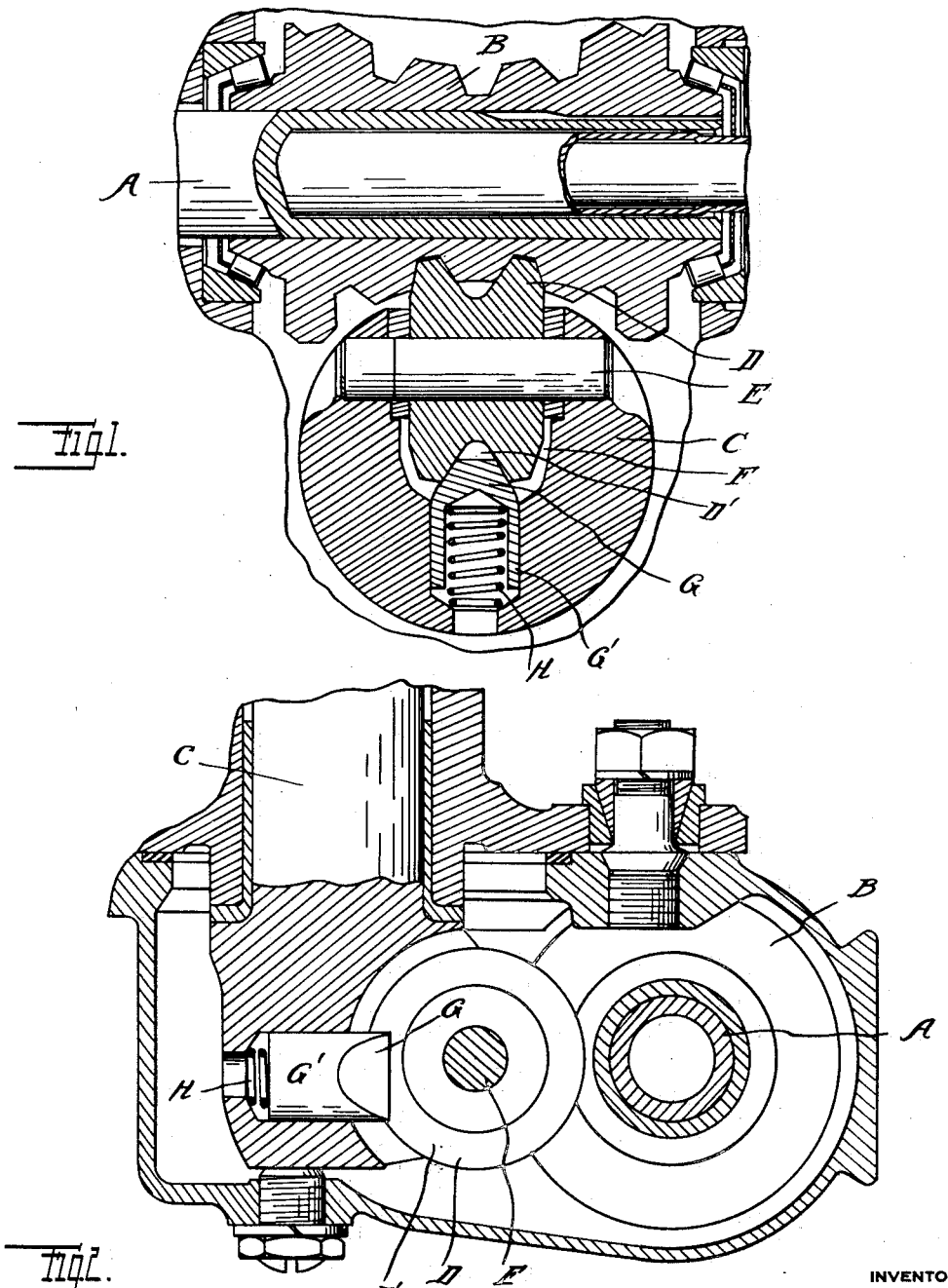
INVENTOR
Edward P. Hammond
BY Whittemore Hulbert
Whittemore & Belknap
ATTORNEYS Patented Feb. 28, 1933

1,899,270

UNITED STATES PATENT OFFICE

EDWARD P. HAMMOND, OF DETROIT, MICHIGAN, ASSIGNOR TO MARLES STEERING GEAR COMPANY OF AMERICA, INCORPORATED, OF NEW YORK, N. Y., A CORPORATION OF NEW YORK

STEERING GEAR

Application filed September 8, 1931. Serial No. 561,787.

The invention relates to worm steering gears of the semi-reversible type and has for its object the obtaining of an easy operating construction and at the same time one which lessens the transmission of road shocks to the wheel.

Heretofore worm gearings have been constructed with roller teeth on the gear member for engaging the worm which lessen the friction and consequently the effort required in turning the steering wheel. Such constructions while advantageous because of their easy operation have the defect that road shocks are more readily transmitted to the wheel. This is due to the fact that the diminished friction between the roller tooth of the gear and the worm renders the construction slightly reversible or outside of the angle of friction as to stresses originating in the ground wheels and transmitted to the hand wheel. It might be theoretically possible to construct a roller tooth with just sufficient additional friction to avoid such result but practicably this would be difficult or impossible and would result in either too much or too little friction.

To overcome the defect above referred to, I have combined with a construction of roller tooth worm gearing which is outside the angle of friction as to stresses originating in the ground wheels, additional friction means to prevent the transmission of objectionable shocks to the hand wheel. This additional friction means is preferably in the form of a friction shoe which is yieldably pressed into contact with the roller tooth and with just sufficient pressure to produce the desired friction.

In the drawing:

Figure 1 is a cross section through a worm gearing of my improved construction in the plane of the axes of the worm and roller tooth;

Figure 2 is a cross section therethrough.

As shown, A is a rotary steering stem, B is a worm of the hour glass type mounted on this stem, C is a rock shaft and D is a roller tooth mounted on said rock shaft eccentric to the axis thereof. The roller tooth D is preferably formed with a V-shaped groove D' therein forming bearing faces for engaging opposite sides of a male tooth of the worm B and also forming between portions on opposite sides of said groove a pair of roller teeth for engaging adjacent grooves in the worm. The roller engages a recess E in the shaft C and is mounted upon an axle F extending transversely of said shaft.

With the construction as thus far described the friction between the worm and the roller D is greatly reduced by reason of the rotation of the latter on its axle F and thus the gearing is easily operated but is not free from the transmission of road wheel shocks to the steering wheel. I have therefore provided additional friction means in the form of a friction shoe G which is of a wedge-shaped form and engages the groove D' in the roller D. This shoe is preferably formed with a cylindrical hollow shank G' which slidably engages a correspondingly formed aperture in the shaft C and a coil spring H within the hollow shank serves to press the tooth against the roller with a predetermined pressure. Thus by selecting a spring H of proper tension any desired amount of friction may be produced to resist rotation of the roller D.

With the construction as described, the amount of friction which is developed by the shoe G produces only a negligible resistance to the turning of the gearing by the hand wheel. However, on account of the fact that the gearing is only to a slight degree reversible, this additional friction will be sufficient to guard against the transmission of road shocks.

What I claim as my invention is:

1. In a steering gear, the combination with a roller tooth worm gearing constructed to be slightly outside of the angle of friction as to stresses originating in the ground wheels, of a friction shoe engaging the roller tooth to yieldably resist rotation thereof.

2. In a steering gear, the combination with a worm, a rock shaft and a roller tooth on said rock shaft grooved to embrace a male tooth on the worm, of a wedge shaped friction shoe engaging the groove in said roller tooth and resilient means for pressing said shoe against said roller tooth to produce a predetermined frictional resistance to the rotation thereof.

3. In a steering gear, a worm gearing comprising a worm of the hour glass type, a rock shaft, a roller tooth eccentrically mounted in said rock shaft and provided with a groove for embracing a male tooth of the worm, a friction shoe engaging the groove in said roller tooth, a hollow shank for said friction shoe radially slidable in a recess in said rock shaft and a spring within said hollow shank for yieldably pressing said shoe against said roller to produce a predetermined frictional resistance to the rotation thereof.

In testimony whereof I affix my signature.

EDWARD P. HAMMOND.